United States Patent
Steingraber et al.

(10) Patent No.: US 10,390,661 B1
(45) Date of Patent: Aug. 27, 2019

(54) UTENSIL RETAINING DEVICE

(71) Applicant: F.N. Sharp, LLC, Tarpon Springs, FL (US)

(72) Inventors: Matthew Steingraber, Tarpon Springs, FL (US); Michael Murray, Tarpon Springs, FL (US); Danielle Steingraber, Tarpon Springs, FL (US)

(73) Assignee: F.N. Sharp, LLC

( * ) Notice: Subject to any disclaimer, the term of this patent is extended or adjusted under 35 U.S.C. 154(b) by 0 days.

(21) Appl. No.: 16/238,291

(22) Filed: Jan. 2, 2019

(51) Int. Cl.
| | |
|---|---|
| *A47J 47/16* | (2006.01) |
| *A47G 21/14* | (2006.01) |
| *F16B 1/00* | (2006.01) |

(52) U.S. Cl.
CPC .............. *A47J 47/16* (2013.01); *A47G 21/14* (2013.01); *F16B 1/00* (2013.01); *F16B 2001/0035* (2013.01)

(58) Field of Classification Search
CPC ......... A47J 47/16; A47G 21/14; A47G 21/00; A47G 29/087; F16B 1/00; F16B 2001/0035; A47B 77/14; A47F 13/08
USPC .... 211/70.7, DIG. 2, 60.1, 62; D7/640, 637, D7/638; 30/298.4, 296.1; 206/372, 373, 206/553; 248/37.3, 111
See application file for complete search history.

(56) References Cited

U.S. PATENT DOCUMENTS

| | | | | | |
|---|---|---|---|---|---|
| 664,600 | A | * | 12/1900 | Weitman ................ | A47G 25/12 211/62 |
| D55,639 | S | * | 7/1920 | Onufryk ...................... | D7/640 |
| 1,346,909 | A | * | 7/1920 | Onufryk ................ | A47G 21/14 211/70.6 |
| 1,861,683 | A | * | 6/1932 | Branch ................ | B24D 15/084 211/70.7 |
| 2,446,016 | A | * | 7/1948 | Lessin ................... | A47G 21/14 211/70 |
| 2,964,201 | A | * | 12/1960 | Huffman ................... | A47F 5/02 206/818 |
| 3,071,252 | A | * | 1/1963 | Hanschar ............... | A47G 21/14 211/70.7 |
| D198,934 | S | * | 8/1964 | Munson ...................... | 211/70.7 |
| 4,423,552 | A | * | 1/1984 | Bourgein ............... | A47G 21/14 248/37.3 |
| 4,497,412 | A | * | 2/1985 | Labelle .................. | A47G 21/14 206/350 |
| 4,534,474 | A | * | 8/1985 | Ng .......................... | B25H 3/04 206/501 |
| 4,575,939 | A | * | 3/1986 | Buchtel ................. | A47G 21/14 211/70.7 |
| D308,619 | S | * | 6/1990 | Klein ............................ | D7/637 |

(Continued)

OTHER PUBLICATIONS https://www.crateandbarrel.com/schmidt-brothers-grey-shiplap-15-piece-knife-set/s456112.

*Primary Examiner* — Jennifer E. Novosad
(74) *Attorney, Agent, or Firm* — Burr & Forman LLP; Jeffrey H. Kamenetsky

(57) ABSTRACT

A utensil holder comprising a main body having a void therein, the main body comprising an outer surface, an upper base, and a lower base, at least one magnet positioned within the void, each of the at least one magnet imparting a magnetic field radially outward, the magnetic field of sufficient strength to removably secure at least one utensil against the outer surface of the main body, and support material within the void of the main body, the support material configured to removably secure the at least one utensil within the void.

11 Claims, 5 Drawing Sheets

(56) References Cited

U.S. PATENT DOCUMENTS

| | | | | |
|---|---|---|---|---|
| D312,559 S * | 12/1990 | Ancona | | D7/641 |
| 5,738,228 A * | 4/1998 | Bittinger | | A47F 7/0021 |
| | | | | 211/60.1 |
| 5,760,668 A * | 6/1998 | Testa | | B23Q 3/1546 |
| | | | | 206/350 |
| D406,214 S * | 3/1999 | Tisdale | | D7/640 |
| 6,082,559 A * | 7/2000 | Levsen | | A47G 21/14 |
| | | | | 211/70.7 |
| 6,439,403 B1 * | 8/2002 | Levsen | | A47G 21/14 |
| | | | | 211/70.7 |
| 6,502,711 B1 * | 1/2003 | Mc Rae | | B65D 21/0204 |
| | | | | 211/71.01 |
| 6,719,155 B1 * | 4/2004 | Chang | | B25H 3/04 |
| | | | | 206/350 |
| D532,658 S * | 11/2006 | Shen | | D7/637 |
| 7,303,493 B1 * | 12/2007 | Ehresman | | A63B 57/10 |
| | | | | 473/386 |
| D562,642 S * | 2/2008 | Schmidt | | D34/1 |
| D591,567 S * | 5/2009 | Yamada | | D7/637 |
| 7,934,610 B2 * | 5/2011 | Zeng | | A47G 21/14 |
| | | | | 211/70.7 |
| 7,971,736 B1 * | 7/2011 | Stewart | | B25H 3/04 |
| | | | | 211/70.7 |
| 8,348,068 B2 * | 1/2013 | Huentelman | | A47J 47/16 |
| | | | | 211/70.7 |
| D711,692 S * | 8/2014 | Ostlundt | | D7/640 |
| 8,905,825 B2 * | 12/2014 | Huff | | B24D 15/081 |
| | | | | 451/344 |
| D804,916 S * | 12/2017 | Leggett | | D7/637 |
| 2002/0175131 A1 * | 11/2002 | Johnson | | A47G 21/14 |
| | | | | 211/70.7 |
| 2003/0000902 A1 * | 1/2003 | Keis | | A47J 47/16 |
| | | | | 211/89.01 |
| 2004/0031769 A1 * | 2/2004 | Schultz | | A47G 21/14 |
| | | | | 211/70.7 |
| 2005/0241984 A1 * | 11/2005 | Mosko | | A47G 21/14 |
| | | | | 206/553 |
| 2008/0060205 A1 * | 3/2008 | Schmidt | | A47G 21/14 |
| | | | | 30/298.4 |
| 2013/0037501 A1 * | 2/2013 | Schmidt | | A47F 7/00 |
| | | | | 211/70.7 |
| 2013/0248470 A1 * | 9/2013 | Klein | | A45C 11/34 |
| | | | | 211/65 |
| 2016/0367055 A1 * | 12/2016 | Rausch | | A47G 21/14 |

* cited by examiner

UTENSIL RETAINING DEVICE

TECHNICAL FIELD

This disclosure relates to a device for securing one or more utensils and, more specifically, to a device that utilizes one or more interior magnets and interior support material to retain one or more knives such that the knives are safely secured, may be easily and safely accessed for use, while allowing the ornamentation on one or more of the knives to be displayed.

BACKGROUND

There are many devices that provide for the storage and accessibility of utensils. Knives, in particular, because of their inherent danger, require a storage device that can safely secure the knives while still allowing easy access to them. Many different types of knife holders are available. Many of these knife holders made of wood, plastic, other materials, or combinations thereof are configured with specific slots that are mated for a particular knife. Wood blocks are also extensively utilized both with and without specific slot or patterns. In some instances, magnets have been utilized. However utilization of magnetic knife holders often leaves the blades of the knives exposed which can easily create a dangerous situation.

Therefore, what is needed is a knife holder that can safely retain and secure knives of different sizes and shapes and allow for easy access to the knives where the user and not the manufacturer of the holder can determine where on or in the knife holder the knives are to be secured. The present disclosure addresses this need.

SUMMARY

The utensil retaining device of the present disclosure, as described herein can be used to secure and allow access to any number or types of utensils. For example, it may be used to secure knives, forks, spoons, scissors, etc. Thus, although the examples and discussion provided below primarily relate to the securing of knives, the present disclosure is not limited to just the retention of knives.

In one embodiment, the utensil retaining device of the present disclosure is a block of wood, plastic or other material with a hollow center and shaped with a plurality of elongated wings.

In one embodiment, the utensil retaining device of the present disclosure has a center cavity that contains flexible rods where any number or type of knives may be placed therebetween without a specific slot or pattern.

In one embodiment, the utensil retaining device of the present disclosure is formed with magnets, and, in one embodiment, rare earth magnets, rectangular in shape, are used.

In one embodiment, two or more magnets are deployed on the interior surface of each wing panel where the magnets provide magnetic properties by which to secure the knives to the outside panels of the block.

In one embodiment, the utensil retaining device of the present disclosure is configured with a space therein for each magnet that is carved out of the back of the panel. The magnets are then covered with a veneer in order to conceal them. Neither the magnets, nor the veneer cover is visible from the outside of the knife block.

In one embodiment, the utensil retaining device of the present disclosure includes magnets that are strong enough to securely secure a utensil, for example, a large chef knife, on the outside of the block, through the material. The magnets allow for utensils to be placed on the outside of the some or all of the panels of the block.

In one embodiment, the magnetic exterior allows the user to display the blade of their knife that may contain a decorative pattern or other type of character that the user wishes to openly display.

In one embodiment, the combination of interior and/or exterior properties allows for knives to be displayed and/or stored in a way that does not necessarily limit the number or type of knives that can fit in the block, and is aesthetically pleasing.

According to one aspect of the disclosure, a utensil holder is provided. The utensil holder includes a main body having a void therein, the main body comprising an outer surface, an upper base, and a lower base, at least one magnet positioned within the void, each of the at least one magnet imparting a magnetic field radially outward, the magnetic field of sufficient strength to removably secure at least one utensil against the outer surface of the main body, and support material within the void of the main body, the support material configured to removably secure the at least one utensil within the void.

According to another aspect of the disclosure, a knife retention block is provided. The knife retention block includes a main body having a void therein, the main body comprised of a plurality of elongated wings, the main body comprising an outer surface, an upper base, and a lower base, at least one magnet positioned along an interior surface of each elongated wing, each of the at least one magnet imparting a magnetic field radially outward, the magnetic field of sufficient strength to removably secure at least one utensil against an outer surface of the plurality of elongated wings, and a plurality of vertically disposed elongated rods each having a first end and a second end, the second ends of each of the elongated rods secured to the lower base of the main body, the plurality of elongated rods situated closely adjacent one another such that a utensil can be removably secured therebetween.

DETAILED DESCRIPTION OF EXEMPLARY EMBODIMENTS

The present disclosure provides a novel system 10 for holding utensils, such as knives. System 10 is configured to secure one or more knives in a manner such that some of the knives are removably secured to the outer surface of a main body thus being visible to, for example, expose handle ornamentation. System 10 can secure other knives such that they are safely secured within an interior of the main body and can be retrieved, used, and re-inserted into the block in an effective and safe manner.

Figure 1:
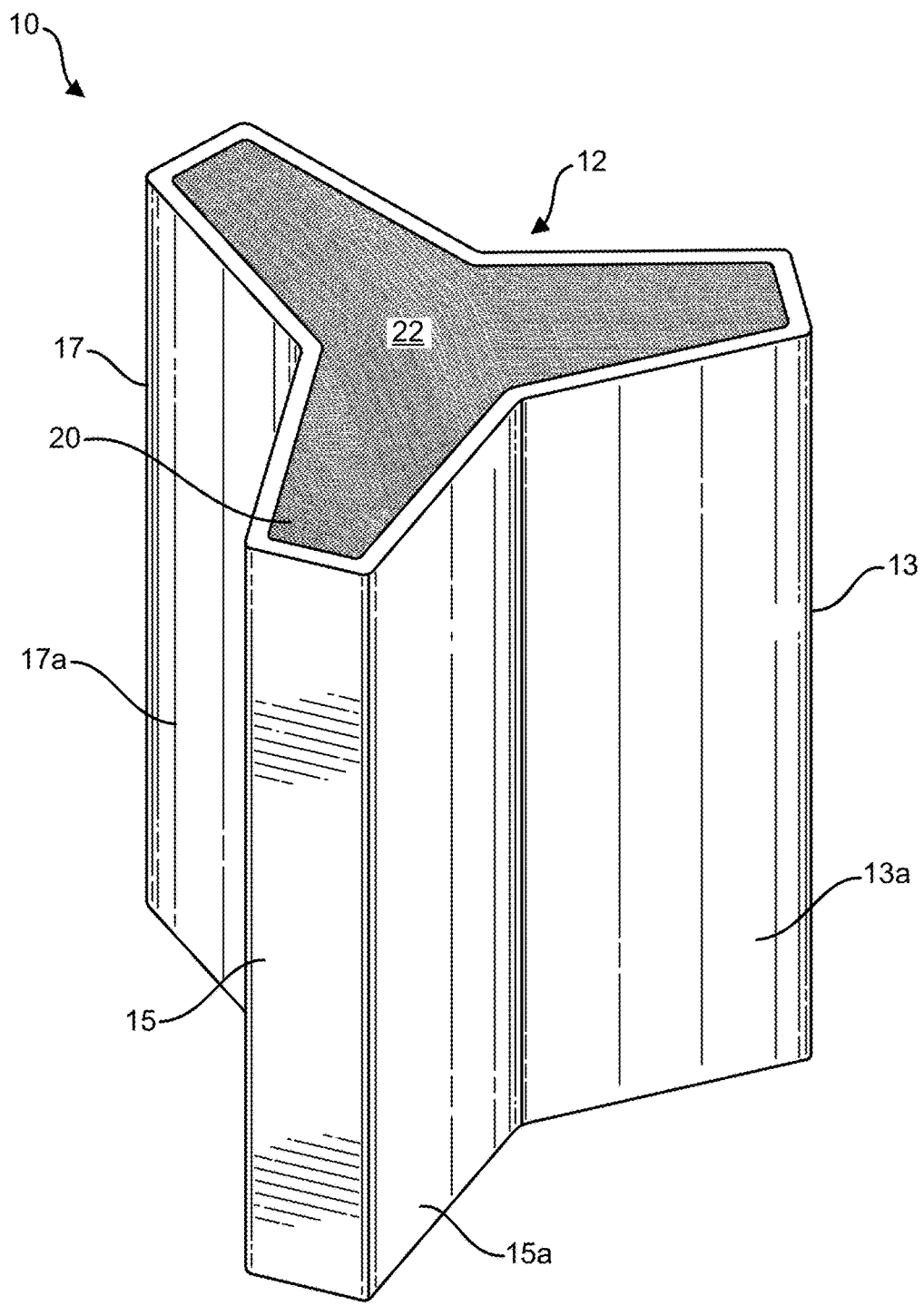
FIG. 1 is a side perspective view of one embodiment of the utensil retaining device of the present disclosure.

FIG. 1 is a front perspective view of system 10. System 10 includes a main body 12 constructed and arranged to have, in one embodiment, a first wing section 13, a second wing section 15, a third wing section 17, an upper base and a lower base. Main body 12 can be constructed of any sturdy material, such as for example, wood or plastic. Further, although main body 12 is shown in FIG. 1 having three wing sections, 13, 15 and 17, main body need not be designed in this fashion. For example, main body 12 can have more or less "wing" sections or no wing sections at all. The use of a main body 12 with elongated "wings" is merely a non-limiting embodiment of the present disclosure.

Main body 12 has a central cavity 20 constructed and arranged to house support material 22. Support material 22 is a material that can secure one or more knives in a substantially upright position such that a user can remove knife from support material 22 by grasping a handle of the knife and lifting the knife from its secured position within support material 12. Support material could be, for example, a plurality of elongated rods, closely packed together such that an elongated utensil such as a spoon or knife may be inserted between the rods, such that the blade of the knife is for the most part secured within the support material 22 while the handle of the knife remains exposed. This can be seen more clearly in FIG. 3.

In the embodiment show in FIG. 1, main body has an outer surface formed of three wings, 13, 15 and 17. Wing 13 includes a first surface 13a and a second surface 13b (not shown), wing 15 includes a first surface 15a and a second surface 15b (not shown), and wing 17 includes a first surface 17a and a second surface 17b (not shown). It is to the outer surface of main body 12 that one or more utensils may be secured as will be described in greater detail below. Thus, both the outer surface and central cavity 20 of main body 20 may be used to secure one or more utensils.

Figure 2:
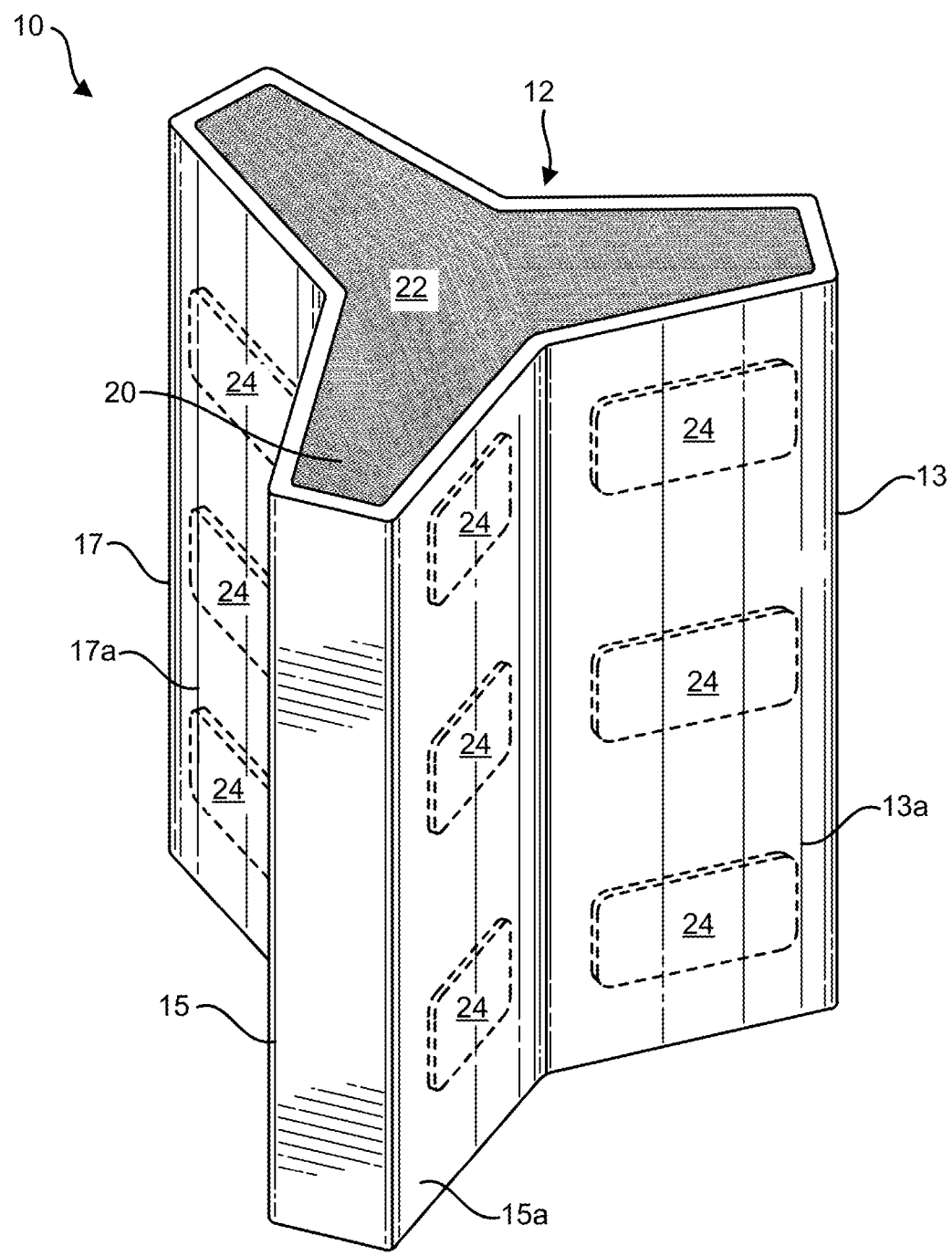
FIG. 2 is a side perspective view of one embodiment of the utensil retaining device of the present disclosure showing the location of interior magnets.

Referring to IG. 2, main body 12 includes one or more magnets 24 affixed to the interior of main body 12. Specifically, one or more magnets 24 are affixed to the inner surface of each wing, as shown by the dashed lines in FIG. 2. Magnets 24 can be affixed to and secured within main body 12 and to each wing in any manner known in the art. Each magnet 24 imparts a magnetic field through each wing section in order to magnetically secure a knife into position on each surface of main body 12. This can be seen in FIG. 3. The present disclosure is not limited to a particular number or shape/design or magnets 24 that can be used in system 10. Although the figures shown three semi-rectangular shaped magnets 24 affixed to the inside surface of each wing section, any number of magnets 24 and any size of magnet 24 may be used. Further, any type of magnet can be used, for example, the magnet 24 may be a rare earth magnet, but need not be. Further, the knife need not be placed in an upright position as shown in the figures but may be placed in any orientation against the surface of main body 12.

Figure 3:
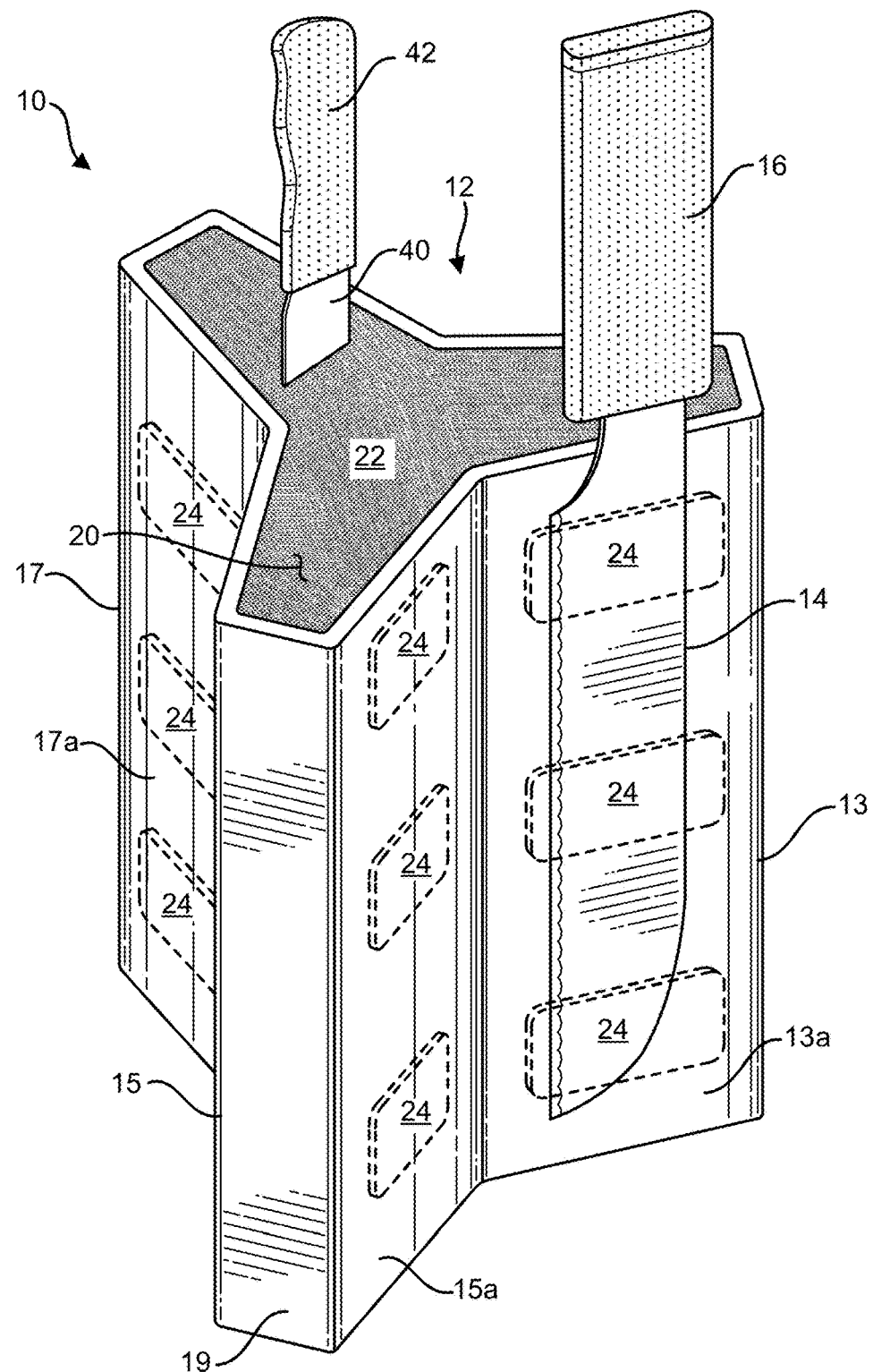
FIG. 3 is a side perspective view of one embodiment of the utensil retaining device of the present disclosure showing the securing of a knife along an outer wall of the device.

In FIG. 3, a knife 14 is shown secured to the outside of main body 12, specifically, against surface 13a of wing 13. Due to the magnetic field created by magnets 24 which are secured along the interior of wing 13, knife 14 is removably secured to the outside of main body 12, i.e., to surface 13a of wing 13. Although only one knife 14 is shown in FIG. 3 it is contemplated that each of the other wings, i.e., wings 15 and 17 can retain a knife 14 in the same manner. Again, although three magnets 24 are shown in the interior of each elongated wing, any number of magnets 24 may be used, placed in any orientation, in order to secure any number of utensils along the exterior surface of main body 12 in a similar manner. The magnets 24 selected to be used with system 10 are chosen such that their magnetic fields are strong enough to allow a utensil, e.g., knife 14 to be secured to the outside of main body 12 yet to also allow a user to easily grasp handle 16 of knife 14 and remove 14 from the surface to which it has been secured to by the magnetic field of magnets 24 placed on the interior of the wing.

In one embodiment material 22, support material helps to secure the magnets 24 up against the interior of each wing. Thus, in one embodiment, the support material are comprised of a plurality of elongated, flexible rods, closely packed together, such that the rods press out against the magnets 24 that are affixed to the interior surface of main body 12. As discussed above, support material 22 is also used to removably secure a knife 40 which has been pushed into the support material 22 and held in a fixed substantially upright position. A user can remove knife 40 by grasping handle 42 to remove knife 40.

As is evidenced by the disclosure and figures, system 10 is configured to hold one or more utensils, such as knives 14 and 40 in the matter described above where the utensils have varying sizes, shapes, and configurations. Advantageously, system 10 allows for knives 14 to be prominently displayed on the exterior of main body 12 in case, for example, the handles of the knives include particularly attractive ornamentation.

In one embodiment, a recess for each magnet 24 is carved out of each side panel, i.e., wing. The magnets 24 are then covered with a material, such as a veneer so as to conceal them. Neither the magnets 24, nor the veneer cover is visible from the outside of main body 12. As depicted by the dashed lines of FIG. 2 and FIG. 3, the magnets 24 are positioned within each wing such that they are not visible to the user.

Although the figures show magnets 24 within the interior surface of each wing 13, 15 and 17, magnets 24 can be placed anywhere within main body 12. Thus, for example, magnets 24 can be placed up against the interior of end portion 19, which is between wings. The present disclosure is not limited to any specific location within main body 12 where the magnets 24 may be placed. Thus, utensils can be affixed to any portion of the outer surface of main body 12, provided there is one or more magnets 24 behind that specific location imparting a requisite magnetic force to removably secure the utensil in place.

As discussed above, the use of elongated wing members 13, 15 and 17 are merely one embodiment of system 10. Main body 12 need not include any wings but instead have a different shape than shown in the figures. The same principle as discussed above would apply, i.e., one or more magnets 24 are placed and secured within the interior central cavity 20 of main body 12, i.e., up against the inner surface, and projecting its corresponding magnetic field radially outward. In this fashion, one or more utensils can be secured to the outer surface of main body 12, while the magnets 24 remain within the interior of main body 12 and unseen to the user or anyone viewing main body 12.

Figure 4:
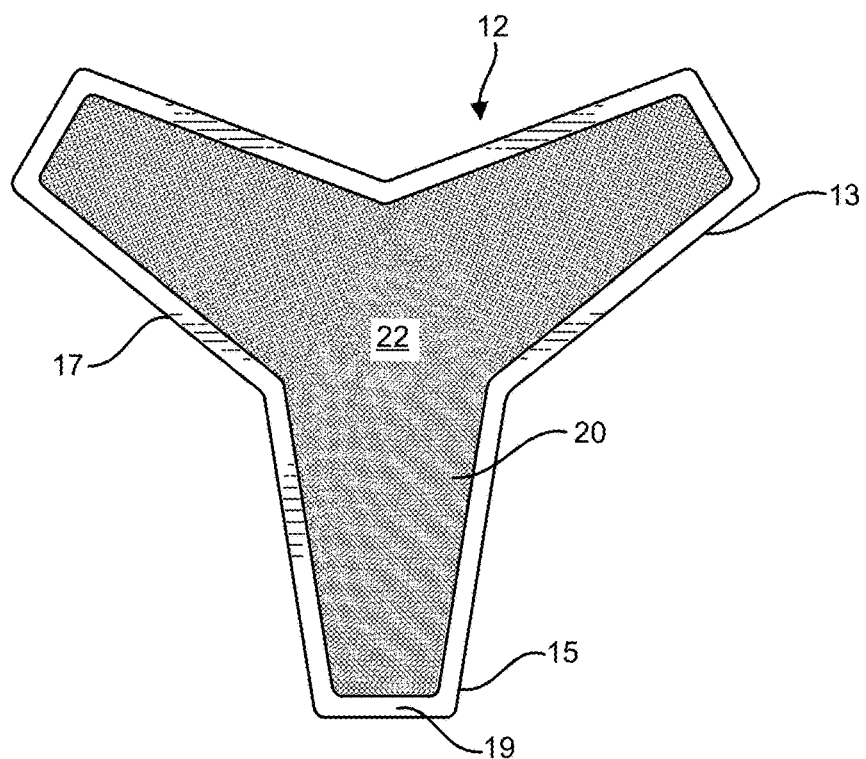
FIG. 4 is a top view of one embodiment of the utensil retaining device of the present disclosure.

FIG. 4 is a top view of main body 12. Support material 22 can be seen substantially filled within the interior central cavity 20 of main body 12.

Figure 5:
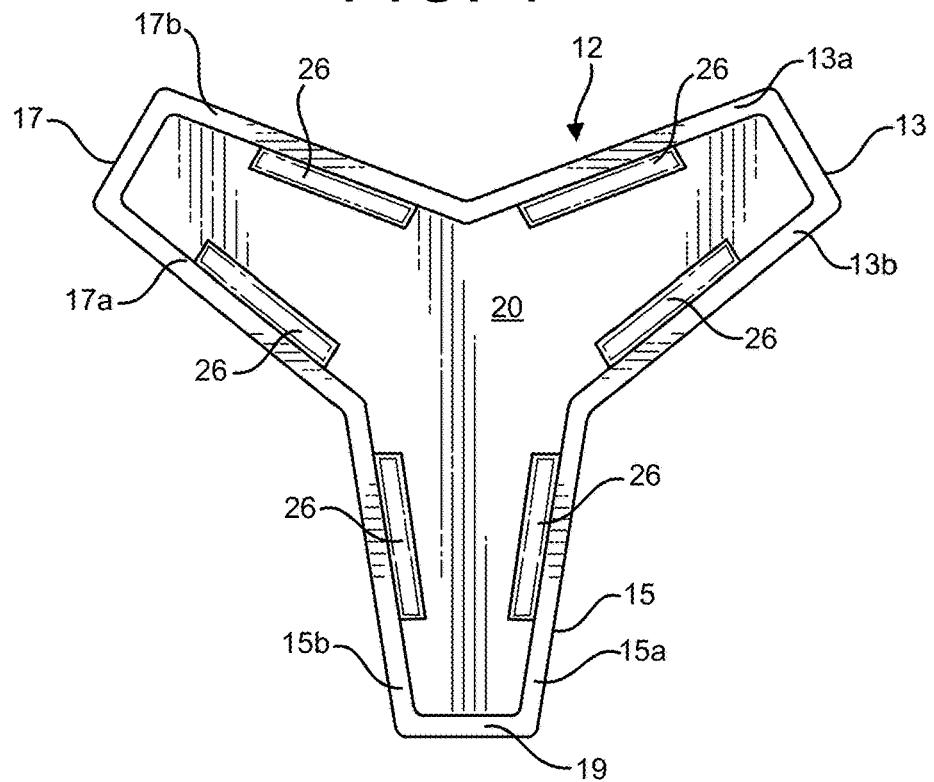
FIG. 5 is a bottom view of one embodiment of the utensil retaining device of the present disclosure.
Figure 6:
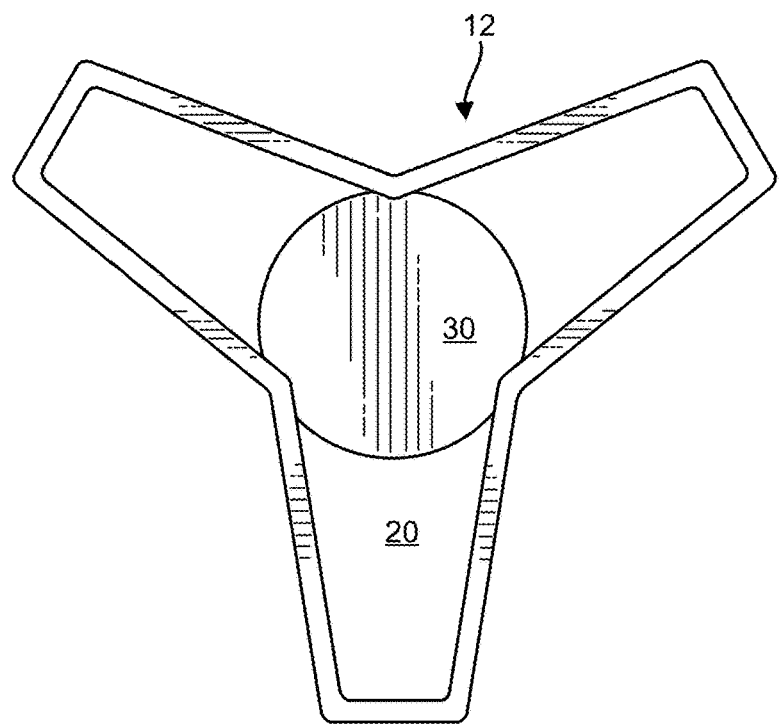
FIG. 6 is a bottom view of an alternate embodiment of the utensil retaining device of the present disclosure.
Figure 7:
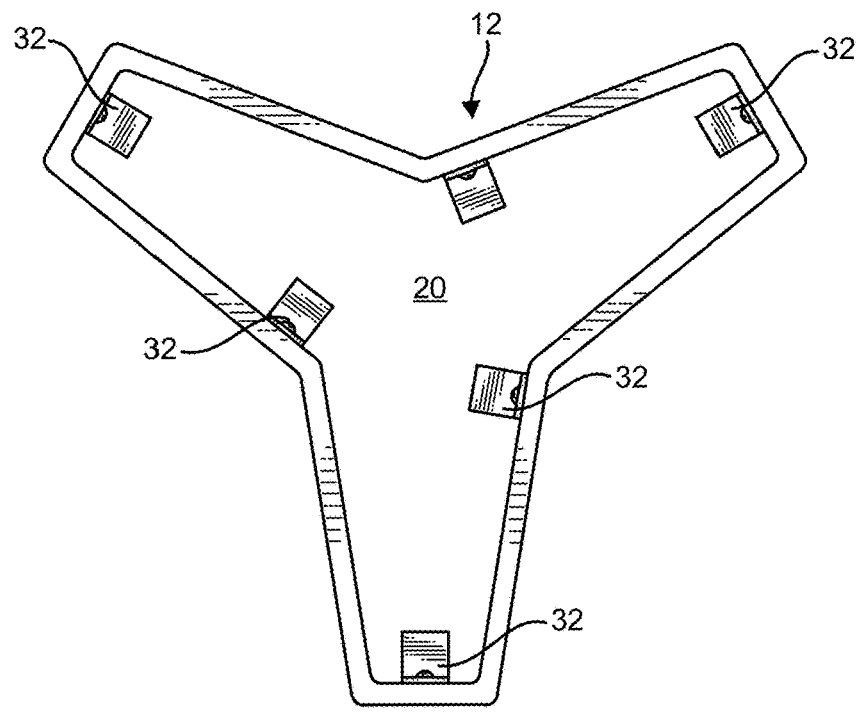
FIG. 7 is a bottom view of yet another alternate embodiment of the utensil retaining device of the present disclosure.

FIGS. 5-7 illustrate bottom views of different embodiments of main body 12. In FIG. 5, one or more flanges 26 are disposed along the bottom of central cavity 20 of main body 12. In one embodiment, the flanges 26 secure the lower base to main body 12. The support material 22, e.g., the elongated rods are secured into the lower base.

FIGS. 6 and 7 illustrate other ways that the lower base can be secured within main body 12. In FIG. 6, a retention disc 30 is situated within main body 12 and the lower base secured to the retention disc. In FIG. 7, retention clips 32 are used to secure the lower base to the bottom of main body 12. Using any of the lower base retention mechanisms in FIGS. 5-7, support material 22 can be placed and secured to the lower base of main body 12. This provides a sturdy and stable platform into which support material 22 can be placed. For example, the lower end of the plurality of elongated rods are secured to the lower base, which itself is secured to main body 12 using one of the aforementioned securing mechanisms.

While the disclosure has been described in its preferred form or embodiment with some degree of particularity, it is understood that this description has been given only by way of example and that numerous changes in the details of construction, fabrication, and use, including the combination and arrangement of parts, may be made without departing from the spirit and scope of the disclosure.

What is claimed is:

1. A utensil holder comprising:
a main body having a void therein, the main body comprising an outer surface, an interior surface, an upper base, a lower base, the outer surface of the main body forming a plurality of elongated wings, each of the plurality of elongated wings having a plurality of outer faces, at least one of the plurality of outer faces adapted to receive at least one utensil thereon;
at least one magnet positioned within the void on an interior surface of at least one of the plurality of elongated wings, each of the at least one magnet imparting a magnetic field radially outward, the magnetic field of sufficient strength to be adapted to removably secure at least one utensil against the at least one of the plurality of the outer faces of at least one of the plurality of elongated wings in a use position; and
support material within the void of the main body, the support material configured to removably secure the at least one utensil within the void in a storage position when not in use.

2. The utensil holder of claim 1, wherein the support material removably secures a portion of the at least one utensil within the void such that an exposed portion of the at least one utensil can be used to extract the at least one utensil from the support material.

3. The utensil holder of claim 1, wherein the support material comprises a plurality of vertically disposed elongated rods.

4. The utensil holder of claim 3, wherein the plurality of elongated rods are situated closely adjacent one another such that a utensil can be removably secured therebetween.

5. The utensil holder of claim 3, wherein the lower base is configured to secure a lower end of each of the plurality of elongated rods.

6. The utensil holder of claim 1, wherein a plurality of magnets are vertically disposed along the interior surface of at least one of the plurality of elongated wings of the main body such that at least one utensil is adapted to be removably secured along the at least one of the plurality of outer faces.

7. The utensil holder of claim 1, wherein the plurality of wings are trapezoidal.

8. The utensil holder of claim 1, wherein the at least one magnet is a rare earth magnet.

9. The utensil holder of claim 1, further comprising at least one magnet retention recess, each magnet retention recess configured to secure a corresponding magnet along an interior surface of the main body.

10. The utensil holder of claim 9, further comprising a concealing material to cover each magnet within its magnet retention recess such that neither the magnets nor the concealing material is visible from outside the main body.

11. A utensil retention block comprising:
a main body having a void therein, the main body comprised of a plurality of elongated wings, the main body comprising an outer surface, an interior surface, an upper base, and a lower base, each of the plurality of elongated wings having a plurality of outer faces, at least one of the plurality of outer faces adapted to receive at least one utensil thereon;
at least one magnet positioned along an interior surface of at least one of the plurality of elongated wings, each of the at least one magnet imparting a magnetic field radially outward, the magnetic field of sufficient strength to be adapted to removably secure at least one utensil against the at least one of the plurality of outer faces of a corresponding at least one of the plurality of elongated wings in a use position; and
a plurality of vertically disposed elongated rods each having a first end and a second end, the second ends of each of the elongated rods secured to the lower base of the main body, the plurality of elongated rods situated closely adjacent one another such that a utensil can be removably secured therebetween in a storage position when not in use.

\* \* \* \* \*